March 24, 1970 J. B. MacMILLAN 3,502,434
PROCESS AND APPARATUS FOR REMOVING MERCURY FROM
CAUSTIC SODA SOLUTIONS
Filed March 27, 1967
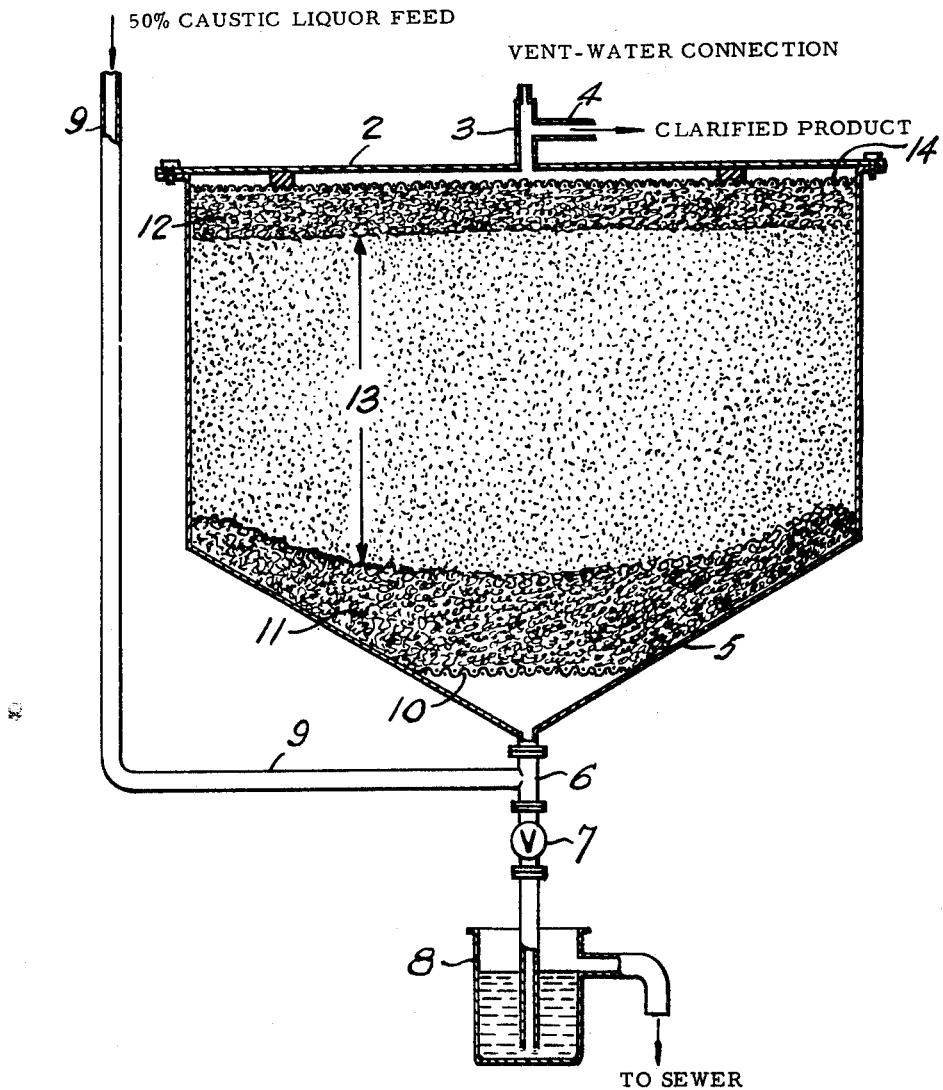
*INVENTOR*
John Buchanan MACMILLAN
*PATENT AGENT*

United States Patent Office 3,502,434
Patented Mar. 24, 1970

3,502,434
PROCESS AND APPARATUS FOR REMOVING MERCURY FROM CAUSTIC SODA SOLUTIONS
John Buchanan MacMillan, Cornwall, Ontario, Canada, assignor to Canadian Industries Limited, Montreal, Quebec, Canada, a corporation of Canada
Filed Mar. 27, 1967, Ser. No. 626,238
Claims priority, application Canada, Apr. 22, 1966, 958,679
Int. Cl. C01d 1/28
U.S. Cl. 23—184       13 Claims

ABSTRACT OF THE DISCLOSURE

A process and apparatus for removing mercury from a mercury cell caustic soda liquor whereby the crude liquor is allowed to pass in a generally upward direction through a composite bed of particulate material selected from polyethylene shreds, polytetrafluoroethylene shreds, graphite, charcoal and activated carbon and pieces of a metal selected from nickel, stainless steel and tantalum. Caustic soda solutions are obtained containing as low a concentration of mercury as 0.1 p.p.m. and 75% of the mercury suspended in the crude caustic liquor can be recovered.

---

This invention relates to a process and an apparatus for the filtration of caustic soda solutions obtained in the preparation of caustic soda by electrolysis of aqueous solutions of common salt in a mercury cell.

The caustic soda liquor obtained in the mercury cell process for the production of caustic soda and chlorine is usually a 50% aqueous solution having a cloudy appearance due to the presence therein of 2 to as high as 100 p.p.m. of mercury in the form of tiny suspended droplets. This mercury contamination is obviously objectionable in most of the chemical processes and preparations involving caustic soda. As mercury is extremely toxic, it is particularly objectionable to customers using the caustic soda for food and drug preparations.

In addition to being cloudy in appearance, the caustic soda mercury cell liquor is very often discoloured to a light brownish cast which is believed to be due to organic contamination (humic acid, etc.) present in the cell feed water. This brownish cast is objectionable from both aspects of product appearance and purity and must therefore be eliminated.

Two conventional methods are being currently used for removing mercury from caustic soda mercury cell liquor. One consists in filtering the liquor through a special carbon precoat type unit while the other makes use of a centrifugation technique. Both of these methods suffer from the serious disadvantages of requiring an equipment expensive to install and operate, of removing merciury to the 0.5 to 1.0 p.p.m. level only and of being unable to eliminate the objectionable brownish cast. With these conventional methods, it becomes mandatory to remove the organic contamination from the feed water before it is fed to the mercury cell.

It has also been proposed to remove mercury from 50% caustic soda liquor by filtering the liquor through a bed of an activated carbon impregnated with silver. This method has been found to give very good results in that a crystal-clear solution is obtained analysing less than 0.5 p.p.m. of mercury and being free of any objectionable brownish cast. Such method has, however, proved hazardous and impractical by reason of the filtering material, namely, the activated carbon impregnated with silver being subject to violent and explosive decomposition.

Several attempts have also been made to remove from the feed water the organic contaminating compounds responsible for the brownish cast in the mercury cell liquor. All such attempts have either been unsuccessful, or have resulted in a burdensome procedure requiring additional equipment.

It is a primary object of the present invention to provide a process constituting an inexpensive, simple and efficient means of removing mercury from caustic soda mercury cell liquor, which process utilizes a filtering medium.

Another object of this invention is to provide a process which will simultaneously remove mercury and eliminate the brownish cast from caustic soda liquor.

A further object of the present invention is to provide a filter specially adapted to obtain the above defined objects.

These and other objects will become apparent to those skilled in the art from the following description of the invention.

The process of the present invention comprises passing a caustic soda mercury cell liquor in a generally upward direction through a scrubbing bed comprising a combination of a particulate material selected from the group consisting of polyethylene shreds, polytetrafluoroethylene shreds, graphite, charcoal and preferably activated carbon and a metal wettable by mercury but resistant to attack by caustic soda.

Examples of metals suitable for use in the process are nickel, stainless steel and tantalum. Preference goes however to nickel and stainless steel. For simplicity, the description will be made hereinafter in connection with the filtering system comprising activated carbon and nickel. The nickel may be in the form of turnings uniformly distributed through the activated carbon or in the form of pads, in which case the activated carbon is sandwiched between such pads.

In a preferred embodiment, the process of the invention comprises circulating a 50% caustic soda liquor substantially vertically upwards from a mercury cell through a bed of activated charcoal sandwiched between nickel mesh pads. With this process, not only the brownish cast but most of the mercury is removed from the caustic soda liquor.

The apparatus for carrying out the process of the invention broadly comprises a column having an outlet at one end and an inlet at the other end, said inlet being at a lower level than said outlet and provided with an intermediate scrubbing combination of a particulate material selected from the group consisting of polyethylene shreds, polytetrafluoroethylene shreds, graphite, charcoal and preferably activated carbon and a metal wettable by mercury but resistant to attack by caustic soda, such metal being preferably nickel.

In a preferred embodiment, the apparatus of the invention comprises substantially vertical column having a removable top provided with a discharge and vent line and a downwardly tapering conical bottom provided with an inlet opening at the apex thereof, said column containing a scrubbing combination of two nickel mesh pads and an intermediate layer of activated carbon.

The principles and practice of the present invention will be more fully understood by reference to the accompanying drawing which is a schematic cross-sectional view of the preferred embodiment of the apparatus of the invention.

In the drawing, 1 is a squat column closed at the top by a removable top 2 provided with an opening communicating with a line 3 the end of which constitutes a vent or water connection. Branched on line 3 is a discharge line 4 for evacuation of the treated caustic soda liquor.

The bottom of the column 1 is in the form of a downwardly tapering cone 5 truncated at the apex to provide an opening. To this opening is connected a line 6 provided with a drain valve 7 and ending into a drain receiver 8. A caustic soda feed line 9 is branched to line 6 above valve 7.

Column 1 contains a filtering bed as hereinbefore defined, such bed being supported on a nickel screen 10, preferably a 4 mesh nickel screen. The bed generally consists of two layers 11 and 12 made of nickel turnings or nickel wire mesh and of a compacted layer 13 of particulate activated carbon interposed between the nickel layers 11 and 12. The bed may advantageously be covered with a nickel screen 14, preferably a 20 mesh nickel screen.

There is no limitation to the shape or form of the nickel from which the layers 11 and 12 are made except that such shape or form must lend itself to the formation of a pad or layer which is permeable to liquids. There is no limit either to the particle size of the activated carbon except that it must be such as to permit the formation under pressure of a liquid permeable activated carbon bed.

It should be understood that column 1 may contain several alternate layers of nickel mesh and carbon instead of the two layers of nickel and single layer of carbon shown in the drawing. It has been found, however, that the provision of a multiplicity of alternate layers does not give appreciable improvement in performance.

In actual operation, a 50% aqueous caustic soda solution from mercury cells (not shown in the drawing) is gravity fed or pumped through line 9, valve 7 being so positioned as to close off line 6. The aqueous solution flows vertically upwards through line 6 and thence into column 1 in contact with layers 11, 13 and 12. The clarified aqueous caustic soda solution flows out of column 1 through line 3 and discharge line 4. Discrete hydrogen gas bubbles separate out from the effluent liquor, the nickel mesh becomes shiny with mercury amalgamation, and globules of mercury separate on the activated carbon.

During operation, the flow rate decreases gradually but can be easily restored by backwashing with water. Recovery of mercury from the backwash liquor as finely divided globules is possible by simple gravity separation.

Although the nature of the phenomena which take place in the process of the present invention is not known, a tentative theoretical explanation is hereinafter provided.

The separation of hydrogen gas bubbles in the clarified liquor can be attributed to a combination of depolarizing and denuding actions of the nickel-carbon electrolytic couple on the microscopic sodium-mercury amalgam particles suspended in the feed liquor. The formation of mercury globules, readily visible in the activated carbon bed, and easily separated by settling from the backwash liquor, is believed to indicate that the method depends on the "coalescing-separating" principle for mercury removal.

"Coalescing" is the process of combining minute mercury particles into particles large enough to separate. For this process, preferential wetting of the nickel mesh by the mercury-sodium amalgam is required. The nickel mesh contacting the feed caustic liquor amalgamates with the mercury as indicated by a shiny appearance. Thus the conditions required for coalescing the minute mercury particles are met.

"Separating" is the process whereby the caustic liquor wets the activated carbon and passes through while the mercury particles do not wet the activated carbon and are retained.

The above explanation is theoretical in nature and obviously is not intended to limit the invention.

It should be understood that the invention is not limited to the single embodiment hereinbefore defined and shown in the accompanying drawing. The scrubbing column, for instance, can be disposed substantially horizontally with the inlet thereto at a lower level than the outlet so that the crude solution to be filtered is allowed to flow in a generally upward direction. Such a disposed column can be packed substantially as shown in the drawing.

In order that those skilled in the art may still better understand the present invention, the following examples are given.

EXAMPLE 1

A laboratory scale scrubber was made of a 10 inch long glass tube of 1⅜ inches diameter. The tube was packed with three two-inch deep layers of activated carbon. The respective mesh sizes of the carbon in the three layers were, from the bottom layer, 14 x 60, 18 x 25 and 6 x 18. These three layers were sandwiched between two one-inch thick pads of nickel wool.

Through the bottom of the scrubbing column so obtained there flowed vertically upwards a 50% caustic soda mercury cell liquor gravity fed from a feed head located approximately two feet higher than the scrubber. After initial conditioning, the scrubber gave excellent results yielding a crystal-clear product analysing from 0.8 to as low as 0.15 p.p.m. of mercury. The scrubber also completely removed the brownish cast from the caustic liquor.

Flow rate at constant head (two feet) decreased gradually to less than half the original rate after a certain period of operation. Backwashing with water at 4 to 6 feet head for 10 minutes restored the flow rate. The backwash liquor was brown for the first 3 to 5 minutes indicating desorption of the organic contamination responsible for the brownish cast in the caustic liquor. Mercury powder separated from the backwash liquor was collected and was estimated at over 1 p.p.m. based on amount of caustic soda liquor treated.

EXAMPLE 2

The column illustrated in the drawing was packed as follows:

On a supporting 4 mesh nickel screen were a nickel mesh wire pad, a flattened nickel wire pad, a layer of 50 lbs. 8 x 30 mesh carbon, a layer of 14 x 60 mesh carbon, a layer of 50 lbs. 8 x 30 mesh carbon, a flattened nickel wire pad, a nickel mesh wire pad and finally, a 20 mesh nickel screen. All of these layers were packed by applying pressure on the top screen.

Vertical upward flow of 50% caustic soda mercury cell liquor fed from a head located up to 34 inches higher than the column yielded a crystal-clear product having a mercury content which decreased from 0.8 p.p.m. at the beginning to 0.1 p.p.m. as the column was conditioned.

Necessary periodic backwash operations yielded backwash liquors from which mercury could be recovered. It was estimated that recovery of the mercury normally lost with the caustic soda liquor should be at least 75% efficient by retorting the sludge separated from the backwash liquor and the spent carbon from the column when repacked.

What I claim is:

1. A process for removing mercury from an aqueous caustic soda solution containing the same as an impurity which comprises passing said solution in a generally upward direction through a scrubbing bed comprised of a particulate material selected from the group consisting of polyethylene shreds, polytetrafluoroethylene shreds, graphite, charcoal and activated carbon and a metal selected from nickel, stainless steel and tantalum in a form which lends itself to the formation of a liquid permeable layer, and recovering the purified solution from the top of the bed.

2. A process according to claim 1 wherein the particulate material is activated carbon.

3. A process according to claim 2 wherein the scrubbing bed is a pressure packed bed comprised of a layer of particulate activated carbon interposed between two layers of metal in a form which lends itself to the formation of a liquid permeable layer.

4. A process according to claim 1 wherein the metal is selected from nickel and stainless steel.

5. A process according to claim 2 wherein the metal is selected from nickel and stainless steel.

6. A process according to claim 3 wherein the metal is selected from nickel and stainless steel.

7. An apparatus for the removal of mercury from an aqueous caustic soda solution containing the same as an impurity, comprising a column having a discharge outlet at one end and an inlet for said solution at the other end, said inlet being at a lower level than said outlet and provided with an intermediate scrubbing bed comprised of a particulate material selected from the group consisting of polyethylene shreds, polytetrafluoroethylene shreds, graphite, charcoal and activated carbon and a metal selected from nickel, stainless steel and tantalum, said metal being in a form which lends itself to the formation of a liquid permeable bed.

8. An apparatus according to claim 7 wherein the particulate material is activated carbon.

9. An apparatus according to claim 8 wherein the metal is nickel or stainless steel.

10. An apparatus according to claim 9 wherein the scrubbing bed is pressure packed and is comprised of a layer of particulate activated carbon interposed between two layers of metal selected from nickel or stainless steel, said metal being in a physical form or shape which lends itself to the formation of a liquid permeable layer.

11. An apparatus according to claim 10, wherein the metal layers are in the form of pads comprised of turnings, wool, wire mesh or screen.

12. An apparatus as claimed in claim 11 wherein the column is a substantially vertical column having a removable top provided with a discharge and vent line, a downwardly tapering conical bottom provided with an inlet opening at the apex thereof and wherein the metal is nickel.

13. An apparatus according to claim 12 wherein the activated carbon bed consists of a layer of 14 x 60 mesh carbon sandwiched between two layers of 8 x 30 mesh carbon, and each of the two pads of nickel consists of flattened nickel wire pad in contact with the carbon, a nickel wire mesh pad and a nickel screen in successive order.

References Cited
UNITED STATES PATENTS

| | | | |
|---|---|---|---|
| 2,083,648 | 6/1937 | Gorke | 23—184 |
| 2,958,585 | 11/1960 | Minger et al. | 23—184 |
| 2,965,445 | 12/1960 | Goens et al. | 23—184 X |

EDWARD J. MEROS, Primary Examiner

U.S. Cl. X.R.

23—285, 293; 75—81; 210—65, 290